J. R. FINNEY,
Assignor to T. B. KERR, Trustee.
RAILROAD CAR TELEGRAPH.
No. 10,232. Reissued Nov. 7, 1882.
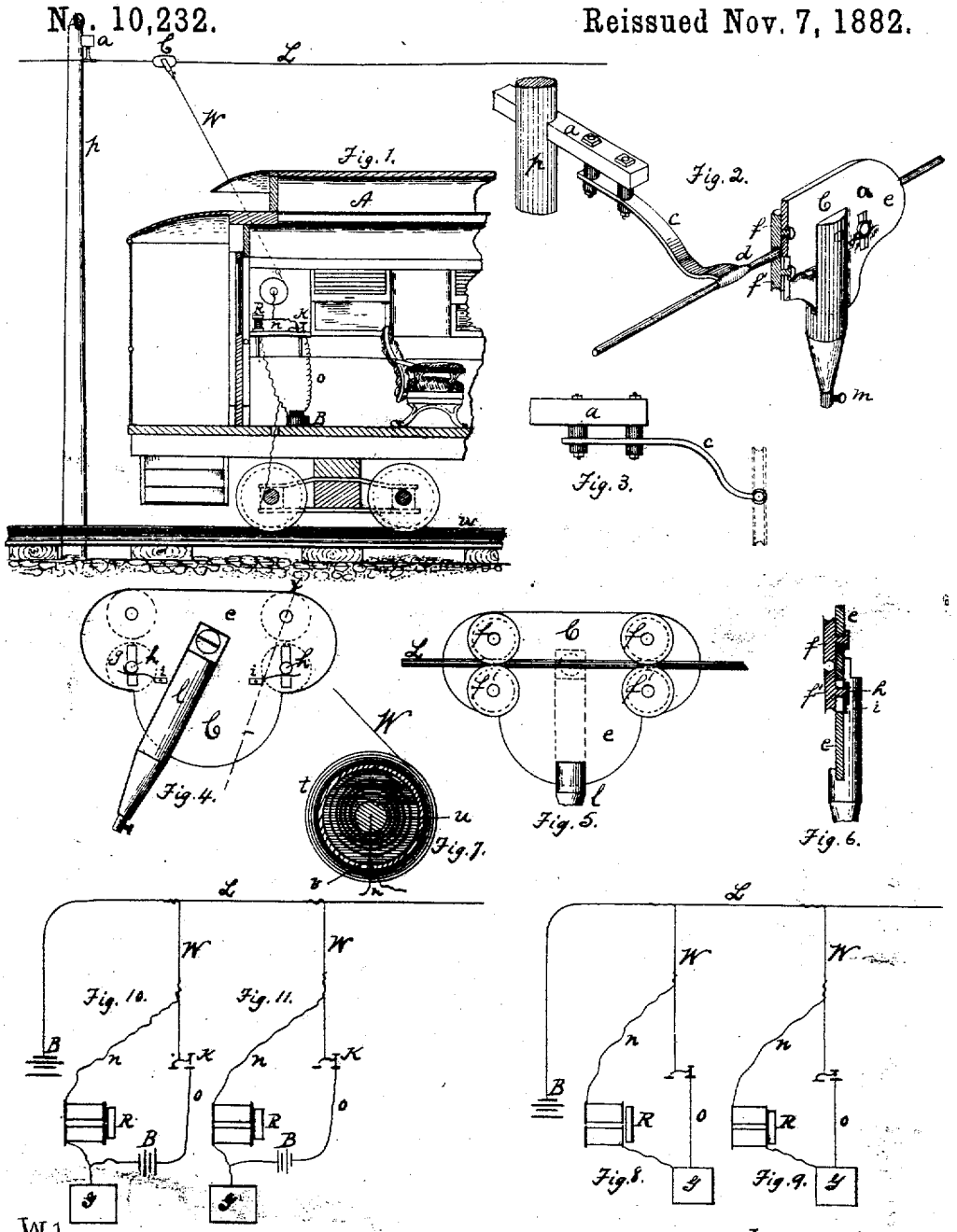
Witnesses.
W. B. Corwin.
Robt. J. Sample.
Inventor.
Joseph R. Finney
by his attys
Bakewell & Kerr
N. PETERS, Photo-Lithographer, Washington, D. C.

BEST AVAILABLE COPY

UNITED STATES PATENT OFFICE.

JOSEPH R. FINNEY, OF PITTSBURG, ASSIGNOR TO THOMAS B. KERR, TRUSTEE, OF ALLEGHENY, PENNSYLVANIA.

RAILROAD-CAR TELEGRAPH.

SPECIFICATION forming part of Reissued Letters Patent No. 10,232, dated November 7, 1882.

Original No. 231,552, dated August 24, 1880. Application for reissue filed August 23, 1882.

*To all whom it may concern:*

Be it known that I, JOSEPH R. FINNEY, of Pittsburg, in the county of Allegheny and State of Pennsylvania, have invented a new and useful Improvement in Railroad-Car Telegraphs; and I do hereby declare the following to be a full, clear, and exact description thereof, reference being had to the accompanying drawings, forming part of this specification, in which—

Figure 1 is a representation of a railway-carriage on the track and of telegraph-poles supporting a telegraph-wire, together with a traveling-train wire and its connections with the main wire and with the telegraph apparatus. Fig. 2 is a representation of the insulated bracket which supports the main wire on the poles and the traveling carrier, showing the connection of the telegraph-wire with both. Fig. 3 is a side view of the cross-piece of the telegraph-pole and the insulated bracket which supports the wire. Figs. 4, 5, and 6 are representations of the traveling carrier, Figs. 4 and 5 showing opposite sides, and Fig. 6 a cross-section through *x x* of Fig. 4. Fig. 7 represents a device for taking up the slack of the train-wire. Figs. 8 and 9 are diagrams illustrating the connection and arrangement of the wires and apparatus where a closed circuit is used. Figs. 10 and 11 are diagrams illustrating the connection and arrangement of wires and apparatus with an open circuit.

In the several figures like parts are marked with the same letters.

My invention relates to the construction of devices whereby telegraphic communication may be constantly maintained between railway-trains, whether moving or stationary, and any of the telegraph-stations along the line of the railroad; and it consists in the combination of a traveling carrier capable of traversing the main telegraph-wire without breaking the electrical contact, a branch wire electrically connecting the instruments in the railroad car with the main wire through the traveling carrier, and a device interposed between the telegraph-instruments and the main-line wire for taking up the slack of the branch wire, so as to enable the electrical connection to be preserved notwithstanding the varying distance between the car and the main wire; also, in a spring-support for the main telegraph-wire, adapted to yield to any sudden or unusual strain on the wire, as in starting the train, and to permit the passage of the carrier of the branch wire without break in the electrical connection; also, in the construction of a traveling carrier for the branch wire, adapted to yield to obstructions and retain its place on the wire and preserve the electrical connection between the branch and main wires.

So far as I have been able to learn, telegraphic communication to and from moving trains of cars on a railway has never been practically accomplished. The chief practical difficulties arise from the great irregularity of distance between the railroad-trains and the line of telegraph-wires, and the fact that in the ordinary method of operating telegraph-lines, where telegraphic communication has to be maintained between the termini and intermediate stations, the main wire is not continuous, but is necessarily cut off at each intermediate station, the electric current being carried by an inleading or branch wire to the local instruments, and thence by another branch wire back to the main line again, the electrical connection between these two branch wires being the instrument at the local station, by which the current on the main line is alternately broken and restored, the connection, when the instrument is not in use, being kept up by a circuit-closer. As, therefore, the main line, and consequently the electric current, is intercepted at each way-station, it is obviously impossible to connect a traveling instrument with the main line by the ordinary methods of operation.

To overcome this difficulty, and in order to secure a continuous electrical connection between a rapidly-moving instrument and the main telegraph wire, I employ a continuous or electrically unbroken main wire, and to each railway-train carrying a telegraph-instrument I lead a single branch wire, which serves both as an inleading and outleading electrical connection with the main telegraph-wire; and in order to preserve the electrical continuity of this main wire and the electrical connection of the railway-carriage with each telegraph-station along the line of railroad, I propose to introduce the same arrangement at each telegraph-office along the line of the railroad, having a single inleading or branch wire connecting directly with the main wire, without break in the circuit on either side of the connection. This of course involves a different mode of operating the entire telegraph-line; but as the telegraph-instruments which I use are or may be the same as those previously employed, the changes which are requisite involve merely a different connection of the wires at the stations with the main line, the instruments, and the ground. This method I will briefly explain as applied either to a closed circuit, which is almost universally used in the United States, or to an open circuit, which is generally employed in Europe.

As used with a closed circuit, as represented in Fig. 8, the instruments are operated in sending a message by connecting the main wire L and ground G through the branch wire W, and instrument wires *n* and *o* by the key K. The electrical communication thus formed being direct, without interposed resistance, all the current passing from the terminal battery is deflected through the branch wire W to the ground, and when the key is released and contact broken the current passes along the main wire, and thus the circuit is alternately made and broken in sending telegraphic signals. In receiving messages by a closed circuit, the contact at the key being broken, as in Fig. 9, there is no connection between the main line L and the ground G through the key K, but only a leak of the current from the main wire L to the ground through the relay-instrument R and sounder or registering-instrument, which leak is restrained by the interposed resistance of the relay, or other additional resistance if the relay is not enough, so as to be sufficient only to operate the relay-instrument, while permitting the main current to pass on to operate other instruments at other way stations. Thus the line is operated at each intermediate station (and also on any train of cars which thus form moving telegraph-stations) by means of one inleading wire from the main wire, the peculiarity consisting in the making and breaking of a direct electrical connection between the main wire and the ground at each way telegraph office, whether stationary or moving.

As used with a closed circuit, the battery-power relied upon is that at the terminal stations, the local battery being used to operate the sounder or registering-instrument.

In using my improvement with an open circuit the local battery of each station supplies the current for the main line when a message is sent therefrom. There being no current on the main wire until set in operation from the battery at the sending-station, all other stations receive their current from the sending-office through the main wire. In sending a message the current flows from the local battery B at the sending-station, through the wire *o* and through the key K, (the contact being closed, as in Fig. 11, by depression of the key,) to the main line L, the relay R being operated by a leak from the side wire, *n*, to the ground at G. In receiving, on the other hand, the current flows from the local battery B at the sending-station over the main line L to the several receiving-stations, and thence through the relay at each to the ground, the relay, and, if necessary, additional interposed resistance, preventing an unnecessary flow of the current to the ground at each station.

In my improvement as applied to railway-trains the telegraph-car A is furnished with a battery, B, a key, K, a relay-instrument, R, and a sounder or registering-instrument. (See Fig. 1.) The wires are connected with these instruments, as shown in Figs. 8 to 11, as already described, the ground-wire being attached to one of the axles of the truck or otherwise having electrical connection with the ground, which in this case is the rail *w*.

The purpose of my invention being to obtain a moving electrical connection with the main-line wire L, the first point to be obtained is to hang the main wire to the telegraph-poles in such a manner as that the traveling carrier of the branch wire may pass uninterruptedly along the main wire L without interruption to its free passage or break in its electrical connection therewith.

The telegraph-poles *p* may be of ordinary construction, but should be placed as nearly as possible at uniform distance from the railroad-track and furnished with cross-pieces *a*, to which are attached the ordinary insulators for the main wires other than the railway-wire. At the end of these cross-pieces *a*, or directly attached to the pole, is a bracket, *c*, which is insulated from its support at the pole *p* in any convenient manner. These brackets should be made of spring-steel, and will tend to relieve the strain of the traveling carrier, as when the train is started. At the end of the bracket is an externally-smooth loop, *d*, which will receive the wire, but afford as little resistance as possible to the passage of the traveling carrier. Such a device is shown in Fig. 2.

The traveling carrier C (represented in Figs. 2 to 6) consists of a metallic plate, *e*, having journaled to it two pairs of sheaves, *f f'*. These sheaves have semicircular grooves in their peripheries, the diameter of the grooves being such as to allow of the free passage of the main telegraph-wire L through the groove. The upper one, *f*, of each of these pairs of sheaves has a fixed bearing, while the lower one has its journal in a slot, *g*, in the plate *e*, and a sliding journal-block, *h*, which is pressed upward in its slot *g* by a spring, *i*, which may be either a leaf-spring, as in the drawings, or a spiral spring set in the slot. By this arrangement the carrier C travels easily along the wire L, the sheaves parting slightly whenever they pass over a splice in the wire or the loops *d*, which support it on the telegraph-poles *p*. The sheaves *f*, with their journals and plate *e*, being metallic, there is at all times an electrical contact between the main wire L and the train-wire W, which is attached to the traveling carrier C by means of a metallic socket, *l*, which is pivoted to the center of the plate *e*, so as to turn freely, and so that the strain of the train wire W may come in line with the main wire L. The train-wire W is secured to the socket *l* by a clamp-screw, *m*, and, being a wire, is flexible enough to swing and bend, so as to bring the draft of the car, when starting or in case of acceleration of speed or of its sudden stoppage, gradually and easily upon the traveler, and thereby prevent the jarring of the traveler and its possible dislodgment from the conductor thereby. The sliding carrier C may be made with a single pair of sheaves; but two pairs will be found preferable, as being less likely to get out of place on the wire and preventing any strain on the main wire L when starting the train. Both of the sheaves in each pair may also be furnished with springs, so as not only to allow the sheaves to separate sufficiently on passing obstructions, but also to give a springing yield to the carrier. The bracket *c* extends laterally from the side of the wire and does not interfere with the passage of sheaves of the carrier. (See Fig. 3.) The train-wire W, thus kept in constant electrical connection with the main-line wire L, enters the telegraph-car, and is there connected with a key, K, and thence a wire, *o*, passes to the ground by being attached to one of the axles of the truck, while a side wire, *n*, from the train-wire W, above its junction with the key K, connects with the relay-instrument R, and thence also to the ground, as before described, the arrangement of the wires connecting the train-wire W with the key K, the relay R, and the ground being adapted to an open or closed circuit, as before described, as either may be used. A battery is also connected with the instrument in the telegraph-car for operating the sounder or registering-instrument, which also serves, where an open current is used, as the source of the electric current for the whole line when telegraphic signals are communicated from the train. Although a closed circuit is almost universally used in the United States, yet I prefer an open circuit, as more efficient and economical where my system of a single inleading wire is employed.

As it is frequently impossible or very inconvenient to have all the telegraph-poles at uniform distance from the railroad-track, and as the distance between the cars and the telegraph-poles is necessarily changed whenever a train runs on a siding or otherwise changes its track, I have devised a plan for accommodating the train-wire to such changes, which I will briefly describe.

In Fig. 7, *t* represents a hollow spool, the axle or shaft of which is metallic, and which is set on insulated standards. Inside this drum is a coiled spring, *u*. The train-wire W is wound around the spool *t*, sufficient wire being so disposed to allow for any variation of distance between the main telegraph-wire and the car. The inner end of this wire W is connected with the metallic axle of the spool *t*. From one extremity of this axle a wire, *v*, connects with the key K of the instrument in the car. The coiled spring inside of the drum keeps the train-wire always taut, but allows of its extension by unwinding it from the drum when the car is removed farther from the telegraph-line.

The operations of receiving and sending telegraphic signals from a telegraph-car on a railroad-train, whether moving or stationary, is precisely similar to the like operation at any stationary telegraph-office by my system, the train telegraph-car being simply a moving instead of a stationary telegraph-office.

The space needed for the telegraph apparatus is so small that it may all be placed in a corner of a baggage-car or in a small compartment or any of the passenger or sleeping cars.

I do not herein claim the arrangement and construction of the instruments and wires forming the open and closed circuits, as shown in Figs. 8, 9, 10, and 11 of the drawings.

Having thus described my improvement, what I claim as my invention, and desire to secure by Letters Patent, is—

1. The combination of a traveling carriage, an overhead electrical conductor, a traveling contact mounted on and capable of traveling along such conductor, and a branch conductor extending from said traveling contact to the carriage, substantially as and for the purposes described.

2. The device for establishing electrical communication between a traveling railway-carriage and a main telegraph-wire, consisting of the combination of a branch wire connected at one extremity with telegraph-instruments in the carriage, and the other extremity connected with an independent device capable of traveling along the main wire, and an interposed device for taking up the slack of the branch wire.

3. The spring arm or bracket *c* for supporting the main telegraph-wire on the poles, so constructed, substantially as described, as to yield to any sudden or extraordinary strain, and to permit the traveling carrier of the train-wire to pass along the main wire without obstruction to its electrical connection therewith.

4. The traveling carrier C, consisting of one or more pairs of grooved metallic sheaves connected by a frame, and capable of relative spring motion to and from each other for the purpose of yielding to obstructions, substantially as and for the purpose described.

5. The combination of a traveling carriage, an electrical conductor placed along the line of the track, a traveling contact mounted undetachably, in the direction of the pull of the carriage, on such conductor, and a branch conductor extending from the carriage to and pivotally connected with such contact, substantially as and for the purposes described.

6. The combination of a traveling carriage, an electrical conductor placed along the line of the track, a traveling contact mounted undetachably, in the direction of the pull of the carriage, on such conductor, and an extensible branch conductor connected to both carriage and contact, to allow for variations of distance between the main conductor and the carriage, substantially as and for the purposes described.

7. The combination of a traveling carriage, an electrical conductor placed along the line of the track, a traveling contact mounted undetachably, in the direction of the pull of the carriage, on such conductor, and a flexible branch conductor extending between and connected to said carriage and contact, substantially as described.

8. The combination of an electric conductor having insulated lateral sustaining-brackets, with a traveling contact mounted on and capable of traveling along such conductor, substantially as and for the purposes described.

In testimony whereof I have hereunto set my hand.

JOSEPH R. FINNEY.

Witnesses:
T. B. KERR,
W. B. CORWIN.